US012627633B2

(12) United States Patent
Levin et al.

(10) Patent No.: US 12,627,633 B2
(45) Date of Patent: May 12, 2026

(54) APPLICATION TRAFFIC AND RUNTIME BEHAVIOR LEARNING AND ENFORCEMENT

(71) Applicant: Palo Alto Networks, Inc., Santa Clara, CA (US)

(72) Inventors: Liron Levin, Kefar Sava (IL); Isaac Schnitzer, Ra'anana (IL); Ory Segal, Tel Aviv (IL); Dima Stopel, Herliya (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 566 days.

(21) Appl. No.: 16/940,876

(22) Filed: Jul. 28, 2020

(65) Prior Publication Data

US 2022/0038423 A1 Feb. 3, 2022

(51) Int. Cl.
*H04L 9/40* (2022.01)
*G06N 20/00* (2019.01)

(52) U.S. Cl.
CPC ......... *H04L 63/0227* (2013.01); *G06N 20/00* (2019.01)

(58) Field of Classification Search
CPC . H04L 63/0227; H04L 63/1416; G06N 20/00; G06N 5/048
See application file for complete search history.

(56) References Cited

U.S. PATENT DOCUMENTS

| | | | | |
|---|---|---|---|---|
| 10,063,434 | B1 * | 8/2018 | Khanal | .................... H04L 43/20 |
| 10,157,413 | B2 * | 12/2018 | Landers, Jr. | ........... G01B 11/00 |
| 10,728,263 | B1 * | 7/2020 | Neumann | ........... H04L 63/1416 |
| 2007/0022203 | A1 * | 1/2007 | Haberkorn | ............ G06F 9/5027 |
| | | | | 709/230 |
| 2009/0103524 | A1 * | 4/2009 | Mantripragada | ... H04L 65/1079 |
| | | | | 370/352 |

(Continued)

OTHER PUBLICATIONS

Title: Scheduling Multi-tenant Cloud Workloads on Accelerator-based Systems Author(S): Dipanjan Sengupta, Anshuman Goswami, Karsten Schwan, Krishna Pallavi Date: 2014 Publisher: IEEE.*

(Continued)

*Primary Examiner* — Shahriar Zarrineh
*Assistant Examiner* — Gita Faramarzi
(74) *Attorney, Agent, or Firm* — Gilliam IP PLLC

(57) ABSTRACT

Systems and methods for learning behavioral activity correlations. A method includes intercepting a plurality of requests, wherein each of the plurality of requests is directed to a respective destination entity of a plurality of destination entities; creating a request queue by queueing the plurality of requests; inspecting contents of the plurality of requests; separately forwarding each intercepted request to its respective destination entity based on the request queue; monitoring runtime output of each of the plurality of destination entities, wherein the runtime output includes behavioral activities of the plurality of destination entities; and training a machine learning model based on the contents of the plurality of requests the runtime output of each of the plurality of destination entities, wherein the machine learning model is trained to output request-output correlations between groups of requests and subsequent behavioral activities.

26 Claims, 7 Drawing Sheets

(56) References Cited

U.S. PATENT DOCUMENTS

| | | | | |
|---|---|---|---|---|
| 2015/0066845 A1* | 3/2015 | Beard | G06F 16/119 | 707/613 |
| 2015/0066852 A1* | 3/2015 | Beard | G06F 16/178 | 707/610 |
| 2016/0188627 A1* | 6/2016 | Beard | G06F 16/119 | 707/625 |
| 2016/0273754 A1* | 9/2016 | Gongola | F21V 29/90 | |
| 2019/0050321 A1* | 2/2019 | Sapozhnikov | G06F 8/00 | |
| 2019/0273754 A1* | 9/2019 | Ting | G06F 9/50 | |
| 2020/0134493 A1* | 4/2020 | Bhide | G06N 5/048 | |
| 2020/0410386 A1* | 12/2020 | Loving | G06F 16/211 | |

OTHER PUBLICATIONS

Title: High Performance in the Cloud with FPGA Groups Author(S): Anca Iordache, Guillaume Pierre, Peter Sanders, Jose Gabriel de F.Coutinho, and Mark Stillwell Date: 2016 Publisher: IEEE/ACM.*

* cited by examiner

APPLICATION TRAFFIC AND RUNTIME BEHAVIOR LEARNING AND ENFORCEMENT

TECHNICAL FIELD

The present disclosure relates generally to application firewalls, and more specifically to learning and enforcement of application firewall policies.

BACKGROUND

One of the main challenges in cloud native environments is to evaluate firewall policies based on entity identifiers rather than information which is not entity-specific such as Internet Protocol (IP) addresses. Thus, techniques for accurately and efficiently evaluating application firewall policies are desirable.

Some application firewall solutions attempt to utilize machine learning to learn identities of entities in order to enable application firewall policy enforcement. To this end, some existing solutions attempt to associate incoming web request with specific application runtime behaviors such as queries, process spawning, and the like. For example, existing solutions may learn that a specific route leads to a specific process being spawned, that a specific route causes a particular database query pattern (e.g., requesting that all users for the route follow a query of a specific table of a database), that a specific route causes a file modification on a disk (e.g., uploading images), and the like.

Existing solutions face challenges in correlating and associating application web events with unrelated runtime events on a live-system. This is particularly challenging in web servers with high traffic load. As a result, existing solutions do not have runtime components and cannot flexibly adapt to changes in associations at runtime.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for learning behavioral activity correlations using traffic shaping. The method comprises: intercepting a plurality of requests, wherein each of the plurality of requests is directed to a respective destination entity of a plurality of destination entities; creating a request queue by queueing the plurality of requests; inspecting contents of the plurality of requests; separately forwarding each intercepted request to its respective destination entity based on the request queue; monitoring runtime output of each of the plurality of destination entities, wherein the runtime output includes behavioral activities of the plurality of destination entities; and training a machine learning model based on the contents of the plurality of requests the runtime output of each of the plurality of destination entities, wherein the machine learning model is trained to output request-output correlations between groups of requests and subsequent behavioral activities.

Certain embodiments disclosed herein also include a non-transitory computer readable medium having stored thereon causing a processing circuitry to execute a process, the process comprising: intercepting a plurality of requests, wherein each of the plurality of requests is directed to a respective destination entity of a plurality of destination entities; creating a request queue by queueing the plurality of requests; inspecting contents of the plurality of requests; separately forwarding each intercepted request to its respective destination entity based on the request queue; monitoring runtime output of each of the plurality of destination entities, wherein the runtime output includes behavioral activities of the plurality of destination entities; and training a machine learning model based on the contents of the plurality of requests the runtime output of each of the plurality of destination entities, wherein the machine learning model is trained to output request-output correlations between groups of requests and subsequent behavioral activities.

Certain embodiments disclosed herein also include a system for learning behavioral activity correlations using traffic shaping. The system comprises: a processing circuitry; and a memory, the memory containing instructions that, when executed by the processing circuitry, configure the system to: intercept a plurality of requests, wherein each of the plurality of requests is directed to a respective destination entity of a plurality of destination entities; create a request queue by queueing the plurality of requests; inspect contents of the plurality of requests; separately forward each intercepted request to its respective destination entity based on the request queue; monitor runtime output of each of the plurality of destination entities, wherein the runtime output includes behavioral activities of the plurality of destination entities; and train a machine learning model based on the contents of the plurality of requests the runtime output of each of the plurality of destination entities, wherein the machine learning model is trained to output request-output correlations between groups of requests and subsequent behavioral activities.

Certain embodiments disclosed herein also include a method for runtime application protection using tournament learning. The method comprises: grouping a plurality of requests directed to a protected entity, wherein each request calls for a respective process, wherein the plurality of requests is grouped based on the process called by each request; monitoring runtime output of the protected entity with respect to each called process, wherein the runtime output includes behavioral activities of the protected entity; and training a machine learning model based on the contents of the plurality of requests and the runtime output of the protected entity, wherein the machine learning model is trained to output correlations between requests and subsequent behavioral activities.

Certain embodiments disclosed herein also include a non-transitory computer readable medium having stored thereon causing a processing circuitry to execute a process, the process comprising: grouping a plurality of requests directed to a protected entity, wherein each request calls for a respective process, wherein the plurality of requests is grouped based on the process called by each request; monitoring runtime output of the protected entity with respect to each called process, wherein the runtime output includes behavioral activities of the protected entity; and training a machine learning model based on the contents of the plurality of requests and the runtime output of the protected entity, wherein the machine learning model is trained to output correlations between requests and subsequent behavioral activities.

Certain embodiments disclosed herein also include a system for runtime application protection using tournament learning. The system comprises: a processing circuitry; and a memory, the memory containing instructions that, when executed by the processing circuitry, configure the system to: group a plurality of requests directed to a protected entity, wherein each request calls for a respective process, wherein the plurality of requests is grouped based on the process called by each request; monitor runtime output of the protected entity with respect to each called process, wherein the runtime output includes behavioral activities of the protected entity; and train a machine learning model based on the contents of the plurality of requests and the runtime output of the protected entity, wherein the machine learning model is trained to output correlations between requests and subsequent behavioral activities.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
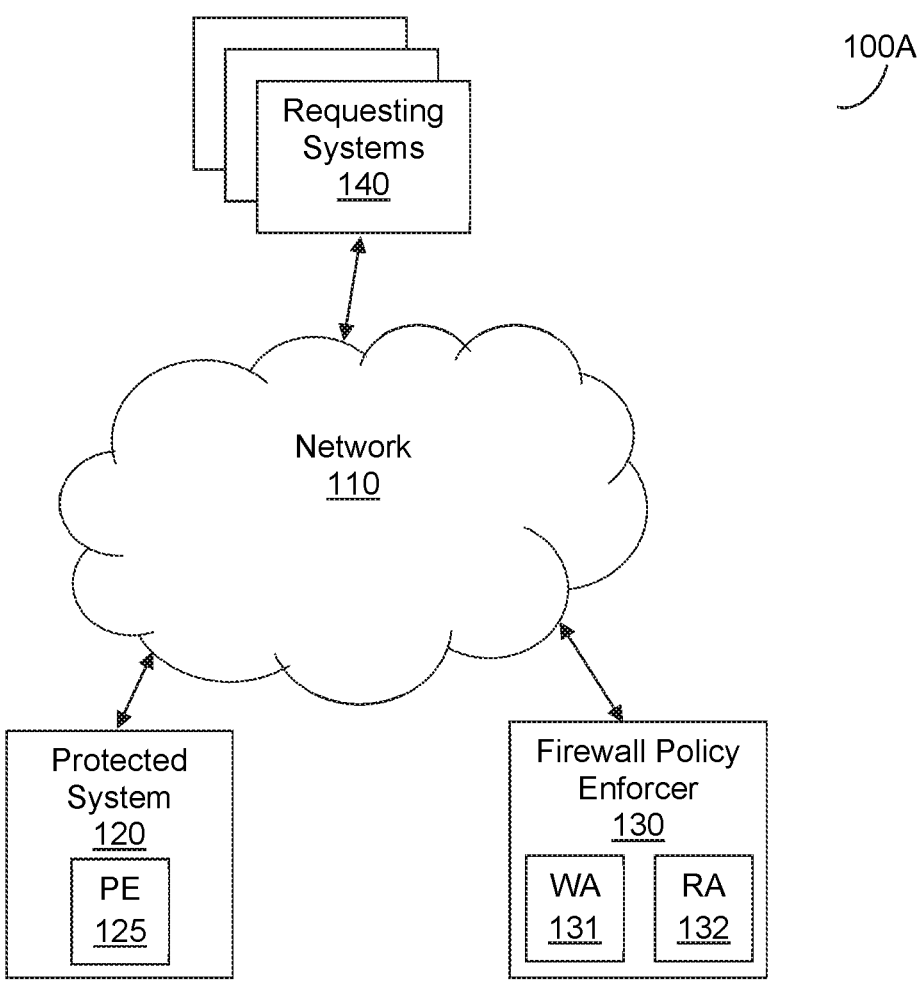
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that, in order to allow for correlating events in a live system, techniques for correlating multiple concurrent requests with runtime behavior are needed. Additionally, once a machine learning model for entity identification is trained, techniques for efficiently enforcing firewall policies by applying such a model in real-time in order to identify entities are implemented.

To this end, the disclosed embodiments include techniques for application traffic and runtime behavior learning and enforcement. Specifically, the disclosed embodiments provide techniques for traffic shaping which enable learning correlating certain web events with unrelated runtime events during specific periods of operation and for specific application programming interfaces (APIs). Additionally, the disclosed embodiments include techniques for tournament learning which enables learning request-response patterns without requiring traffic shaping.

The various disclosed embodiments include a method and system for traffic shaping in a web application firewall (WAF) deployment. During a learning phase for a machine learning model, incoming requests to a destination are intercepted and queued. The requests are inspected to identify content thereof. Each request is forwarded to the destination in series based on the order of the queue. Runtime output of the destination is monitored. The runtime output includes behavioral activities of an entity to be protected such as an application. It is determined whether each behavioral activity is permitted in accordance with an applicable firewall policy.

The content of each request, the behavioral activities, and the determinations of permissions are input to a machine learning algorithm as part of a learning process. The result is a machine learning model trained to identify permissible and impermissible correlations between requests and runtime outputs. Based on the machine learning, a firewall enforcement model is created. The firewall enforcement model includes, but is not limited to, lists of allowed and forbidden correlated request-output data.

When the firewall enforcement model has been created, a set of behavioral activities to be detected is determined. The behavioral activities to be detected may be behavioral activities included in forbidden correlated request-output data.

During an application phase for the machine learning model, runtime behavior of the protected entity is monitored for these behavioral activities. When any of these behavioral activities is detected, requests received within a sliding time window preceding the behavioral activities are collected and grouped. The behavioral activity data and preceding requests are input to the machine learning model to determine correlations therein. Based on the determined correlations and the firewall enforcement model, it is determined whether to continue allowing the behavioral activities to occur or to perform mitigation actions for preventing the behavioral activities from occurring.

The learning may occur periodically to update the firewall enforcement model to improve precision of correlation identification. In an embodiment, decisions on whether to engage in new learning processes occur dynamically during runtime. To this end, the when to continue learning may be dynamically determined based on data such as, but not limited to, route, query parameters, route verbs, and traffic load.

The traffic shaping embodiments allow for effectively learning correlations between requests and behavioral activities at runtime. More specifically, by intercepting and queuing all incoming requests, the requests may be effectively separated from each other to allow for more accurate correlation between requests and subsequent behavioral activities. Further, new learning occurs selectively at runtime, thereby allowing for adjusting correlation identification during operation while reducing interference with operation of the protected entity.

The various disclosed embodiments also include a method and system for runtime application protection. During a learning phase for a machine learning model, request metadata of each incoming request is stored and utilized to linearize the responses to requests. More specifically, requests for calls to the same process are synchronized and grouped together into batches. The requests of each batch are inspected to identify content thereof.

Runtime output of the destination is monitored. The runtime output includes behavioral activities of an entity to be protected such as an application and may further include runtime characteristics of the protected entity. It is determined whether each behavioral activity is permitted in accordance with an applicable firewall policy. The contents of the requests of each batch, the runtime output, and the determinations of permissions are input to a machine learning algorithm as part of a learning process. Based on the learning process, a firewall enforcement model is created. The firewall enforcement model includes, but is not limited to, lists of allowed and forbidden correlated request-output data.

The firewall enforcement model may further include a list of forbidden parameters, a list of forbidden queries, routing procedures for specific behaviors (e.g., routing when a parameter causes a spike in central processing unit activity), or a combination thereof. The forbidden parameters and queries may further be user-specific, i.e., certain parameters and queries are forbidden for certain users but not for others. To this end, in an embodiment, the machine learning model may be further trained to output correlations between runtime outputs and users by including user identifiers in the training data. More specifically, by identifying users in relation to requests they sent, correlations between requests and subsequent runtime output can be utilized to identify the users that caused such runtime output, thereby correlating between the runtime output and those users.

When the firewall enforcement model has been created, a set of behavioral activities to be detected is determined. The behavioral activities to be detected may be behavioral activities included in forbidden correlated request-output data.

During an application phase for the machine learning model, runtime behavior of the protected entity is monitored for these behavioral activities. When any of these behavioral activities is detected, a set of requests received within a sliding time window preceding the behavioral activities are collected and batched with respect to the processes they call. The behavioral activity data and batches of requests are input to the machine learning model in order to determine correlations between behavioral activities and batches of requests. Based on the determined correlations and the firewall enforcement model, it is determined whether to continue allowing requests to each process to occur or to perform mitigation actions for preventing responses to such requests.

In addition to the various benefits described above including effectively separating requests for more accurate correlations, the tournament learning approach allows for implementing correlation and enforcement without requiring deploying a proxy or other external system. In other words, this approach can be utilized to realize Runtime Application Self-Protection (RASP) techniques. Further, since the enforcement can be performed locally at the system in which the protected entity is installed, the RASP may utilize data such as runtime characteristics which may not be accessible to external systems This further improves the precision of correlations. Moreover, these techniques allow for combining WAF, runtime policies, and behavioral learning technologies in a deterministic manner, i.e., such that similar batches of requests are reliably correlated to the same runtime behavior.

FIG. 1A shows an example network diagram 100A utilized to describe the various disclosed embodiments. In the example network diagram 100A, a protected system 120, a firewall policy enforcer 130, and one or more requesting systems 140 are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The protected system 120 may be, but is not limited to, a server, a personal computer, a laptop, a tablet computer, a smartphone, a wearable computing device, or any other system on which an entity 125 to be protected is run. The protected entity (PE) 125 is configured to perform one or more functions as part of a service delivered to the requesting systems 140. To this end, the protected entity 125 may be, but is not limited to, an application, a software container, a virtual machine, and the like. In this regard, the protected system 120 may act as a server providing such services to clients including the requesting systems 140.

The firewall policy enforcer 130 is configured to perform at least a portion of the disclosed embodiments. More specifically, in an embodiment, the firewall policy enforcer 130 is configured to intercept requests from the requesting systems 140 to the protected entity 125, to learn allowed and forbidden request-output correlations using machine learning, and to enforce a firewall policy by identifying new correlations. An example method performed by the firewall policy enforcer 130 of FIG. 1A is described further below with respect to FIG. 2.

Figure 1B:
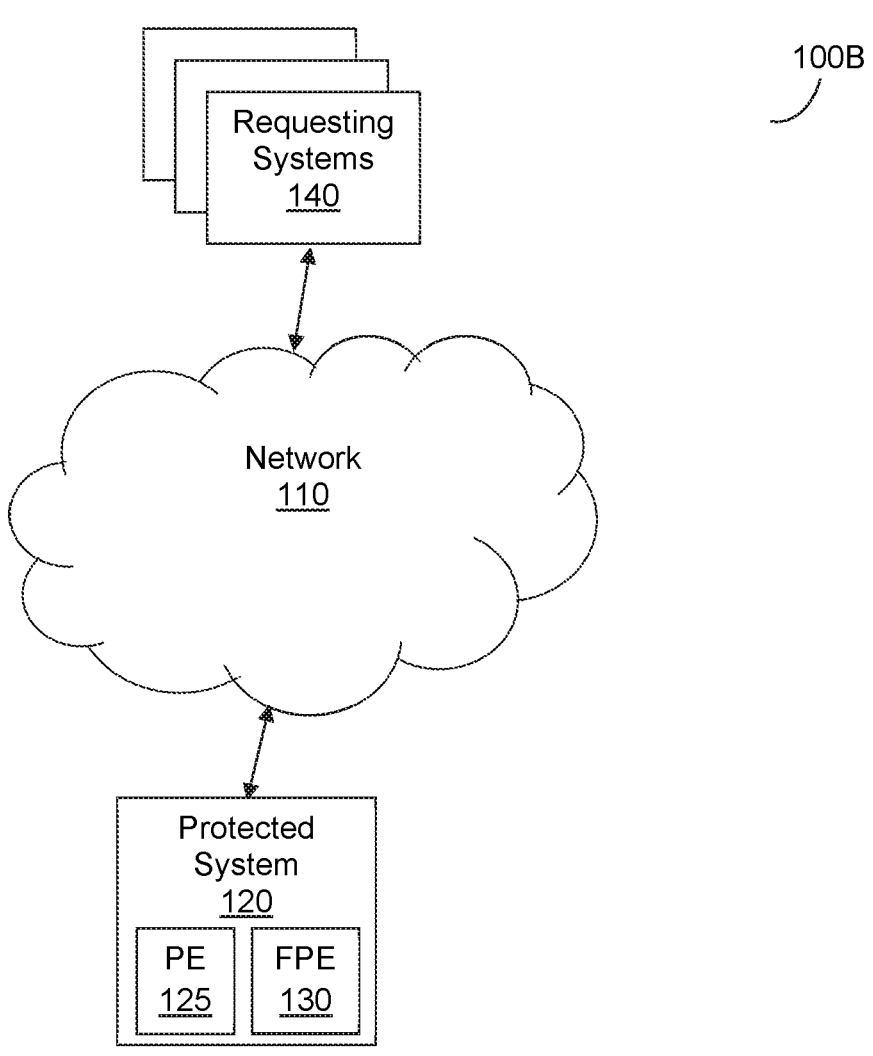

FIG. 1B shows an example network diagram 100B utilized to describe various disclosed embodiments. In the network diagram 100B, the firewall policy enforcer 130 is implemented as an agent installed on the protected system 120 instead of as a separate system. The agent is a software entity and may be or may include, but is not limited to, an application, a software container, a virtual machine, and the like. An example method performed by the firewall policy enforcer 130 of FIG. 1A is described further below with respect to FIG. 3. In the network diagram 100B, the protected system 120 may be configured as described below with respect to FIG. 6 with a memory portion 625 including the instructions of the firewall policy enforcer 130.

Figure 2:
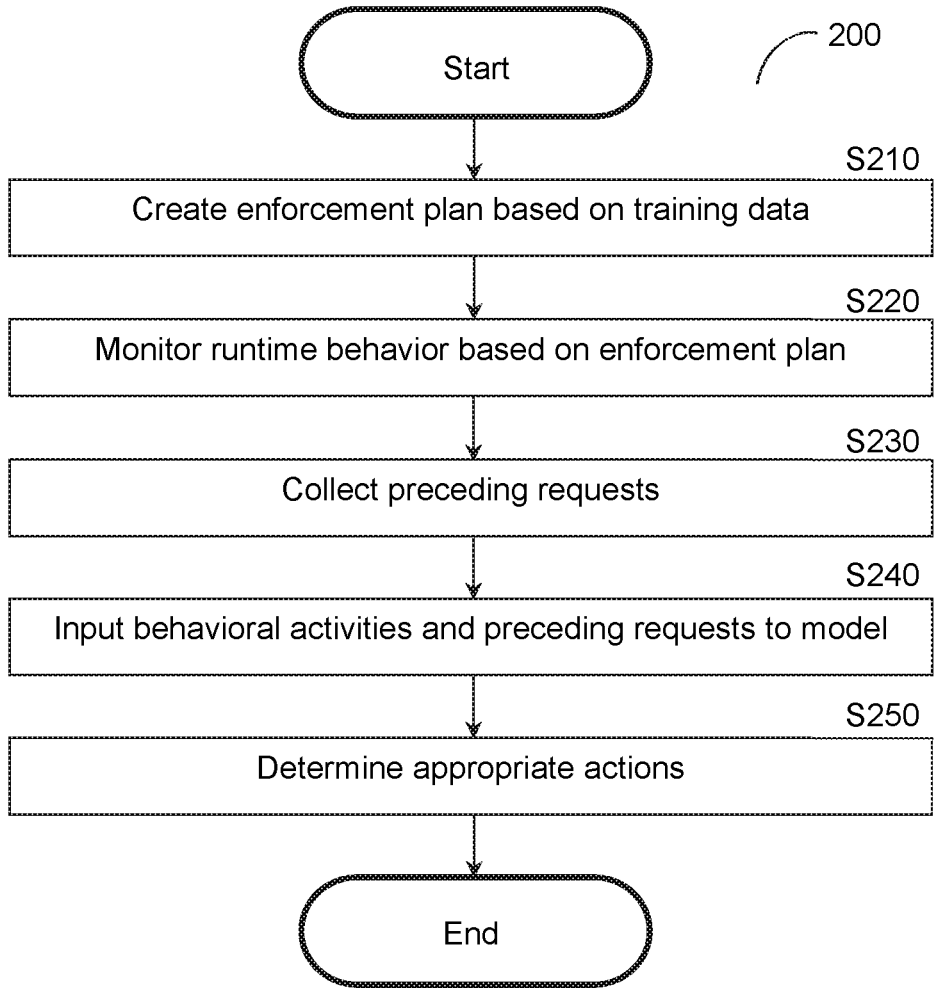
FIG. 2 is a flowchart illustrating a method for firewall policy enforcement using traffic shaping according to an embodiment.

FIG. 2 is an example flowchart 200 illustrating a method for firewall policy enforcement using traffic shaping according to an embodiment. In an embodiment, the method is performed by the firewall policy enforcer 130, FIG. 1A.

At S210, an enforcement plan is created based on training data. In an embodiment, creating the enforcement plan includes training a machine learning model to identify allowable and forbidden correlations between request contents and behavioral activities, creating a firewall enforcement model, and determining behavioral activities to monitor for at runtime. An example method for creating an enforcement plan is now described with respect to FIG. 3.

Figure 3:
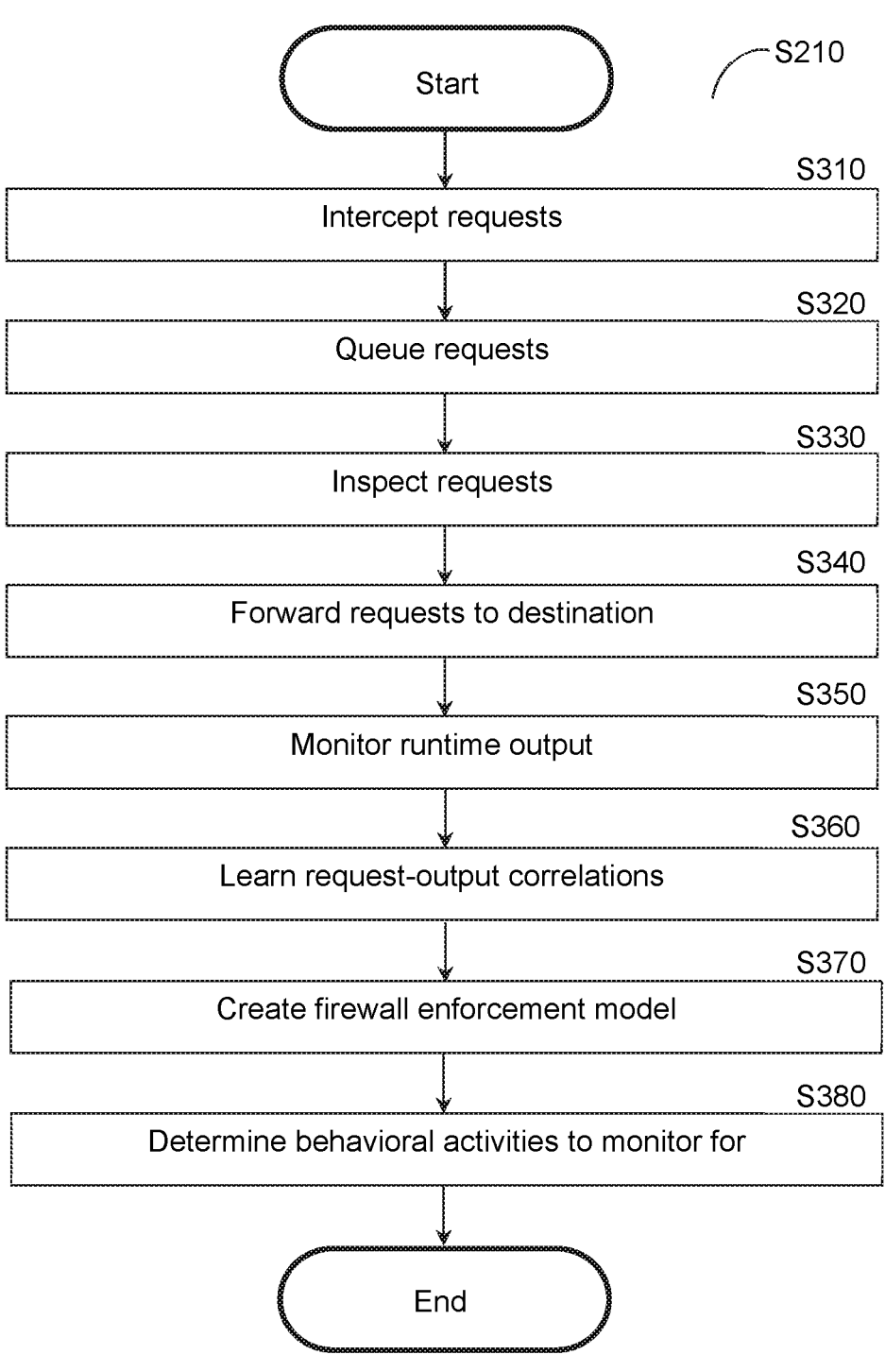
FIG. 3 is a flowchart illustrating a method for creating an enforcement plan according to an embodiment.

FIG. 3 is an example flowchart S210 illustrating a method for creating an enforcement plan according to an embodiment. In an embodiment, the method is performed for a protected entity (e.g., the protected entity 125, FIG. 1A).

At S310, requests directed at a protected entity are intercepted.

At S320, the intercepted requests are queued based on their respective times of interception. If requests are received at the same time, a priority may be determined (e.g., arbitrarily based on metadata or randomly) and the requests may be queued accordingly.

At S330, the contents of each request are inspected.

At S340, the requests are forwarded to their destination, i.e., the protected entity. In an embodiment, the requests are sent separately based on the order of the queue.

In this regard, it has been identified that, when multiple requests are received at a system simultaneously, effectively identifying which requests correspond to which subsequent behavior of the system becomes more challenging and, as a result, identification of such correlations typically becomes less accurate. To this end, intercepting and queueing requests allows for better separating requests and the responses to those requests. As a result, this sequencing improves accuracy of correlation detection as compared to solutions where multiple requests that could have caused a subsequent behavior are received at the same time and it is therefore not practical to identify the request which correlates to the subsequent behavior.

At S350, runtime output of the protected entity is monitored, and runtime output data is collected. Portions of runtime output to be monitored for may include, but are not limited to, filesystem events, process events, network events, queries to specific databases, and the like. The collected data includes at least behavioral activities of the protected entity. Each of these behavioral activities is the result of a preceding request and can therefore be correlated to a preceding request to isolate the cause of the behavior. This, in turn, may be used to determine whether the behavior represents a cyber-attack which requires mitigation.

At S360, the request contents and runtime output data are input to a machine learning model to train the machine learning model to identify correlations between requests and behavioral activities. Further, the inputs to the machine learning model include indicators of whether each request-output correlation is allowed or forbidden such that the machine learning model is further configured to output an indication of whether each identified correlation is allowed or forbidden.

At S370, a firewall enforcement model is created based on the trained machine learning model. In an embodiment, the firewall enforcement model includes a list of allowed request-output correlations, a list of forbidden request-output correlations, or both.

At S380, behavioral activities to monitor for are determined based on the firewall enforcement model. More specifically, the behavioral activities to monitor for include any behavioral activities included in a forbidden request-output correlation such that occurrence of that behavioral activity may indicate forbidden activity.

Returning to FIG. 2, at S220, runtime behavior of the protected entity is monitored based on the created enforcement plan. More specifically, runtime behavior is monitored in order to detect the behavioral activities determined at S380, FIG. 3.

At S230, for each runtime behavior detected at S220, requests in a period of time preceding occurrence of the behavioral activity are collected and grouped. In an embodiment, each time period is a sliding window occurring before the time of the respective behavioral activity.

At S240, the collected requests and their respective behavioral activities are input to a machine learning model trained as described further above with respect to FIG. 3. The model outputs correlations between groups of requests and behavioral activities as well as an indication of whether each correlated behavioral activity is allowable or forbidden.

At S250, based on the output of the machine learning model, appropriate actions for responding to the potentially forbidden activities are determined. In an embodiment, S250 includes performing mitigation actions for any request-output correlations that were identified as forbidden. The mitigation actions may include, but are not limited to, preventing requests, generating an alert, and the like.

Figure 4:
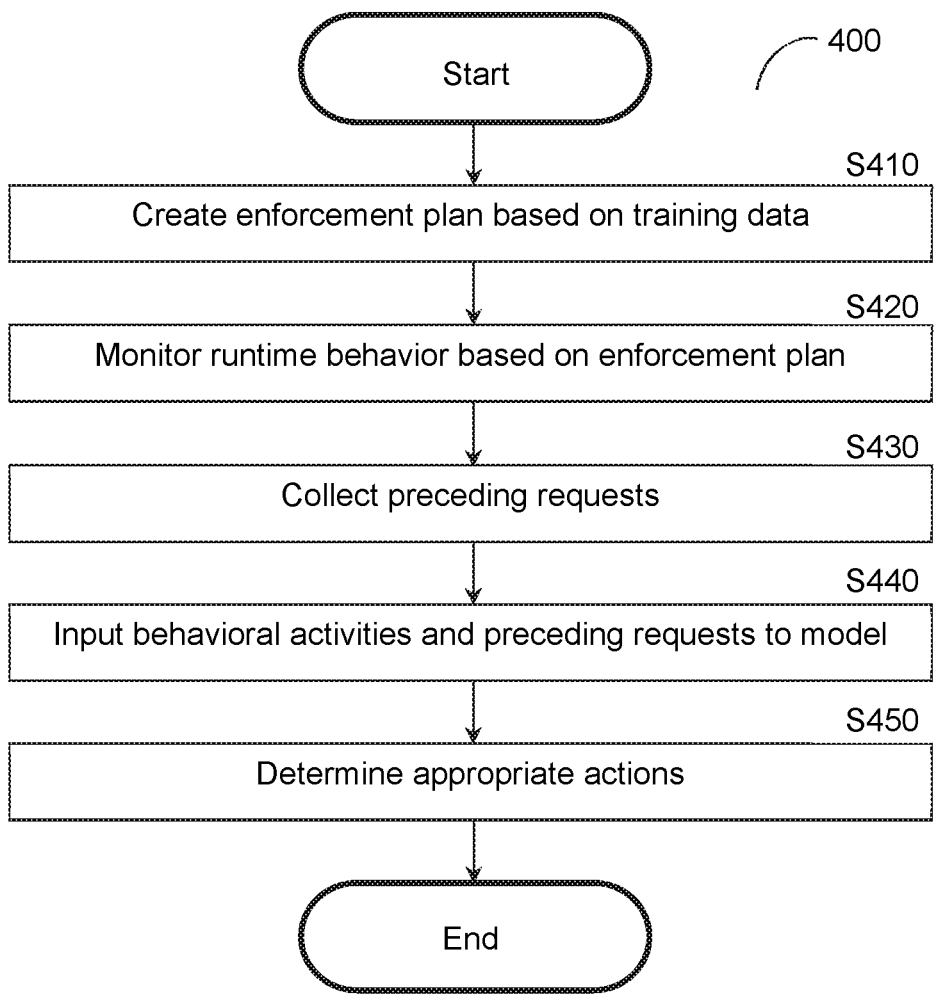
FIG. 4 is a flowchart illustrating a method for runtime application protection according to an embodiment.

FIG. 4 is an example flowchart 400 illustrating a method for runtime application protection according to an embodiment. In an embodiment, the method is performed by the firewall policy enforcer 130, FIG. 1B.

At S410, an enforcement plan is created based on training data. In an embodiment, creating the enforcement plan includes training a machine learning model to identify allowable and forbidden correlations between request contents and behavioral activities. An example method for creating an enforcement plan is now described with respect to FIG. 4.

Figure 5:
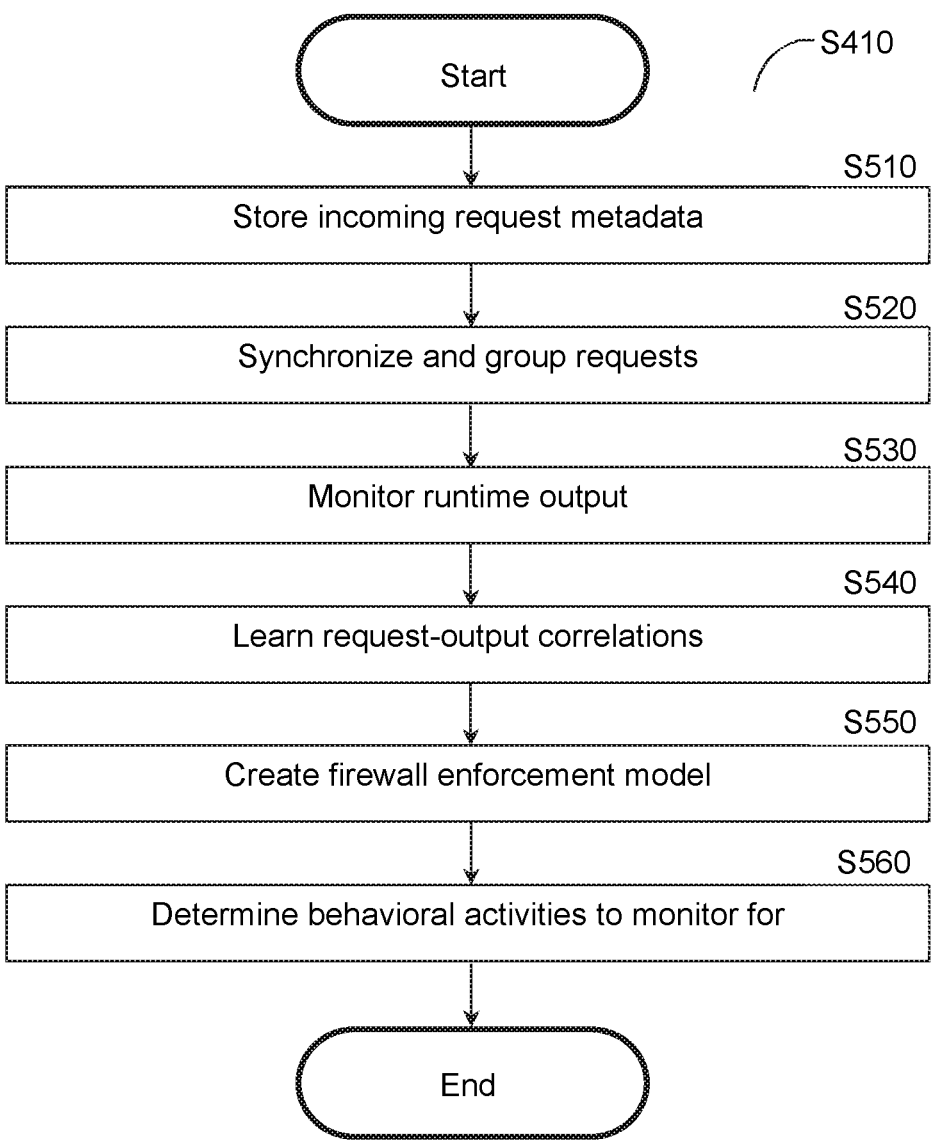
FIG. 5 is a flowchart illustrating a method for learning correlations between requests and runtime outputs according to an embodiment.

FIG. 5 is an example flowchart S410 illustrating a method for learning correlations between requests and runtime outputs according to an embodiment.

At S510, metadata of incoming requests is stored. The request metadata may include but is not limited to, requested processes, identifiers of intended recipients, identifiers of requesting users, combinations thereof, and the like.

At S520, the metadata of the respective requests are synchronized and grouped with respect to requested processes. More specifically, metadata of requests for the same process are grouped together.

As noted above, it has been identified that, when multiple requests are received at a system simultaneously, effectively identifying which requests correspond to which subsequent behavior of the system becomes more challenging and, as a result, grouping metadata of requests allows for separating the requests from the effects they have on runtime output. More specifically, by grouping requests directed to the same process, relationships between specific requests and subsequent behavior of the entity can be isolated by comparing among request-output correlations. As a non-limiting example, consider three types of requests A, B, and C. In the data used for training the machine learning model, the following groups of requests and corresponding runtime outputs are observed:

Request $A$+Request $B$=Behavioral Activity $X$

Request $B$+Request $C$=Behavioral Activity $X$

Request $A$ alone=no forbidden behavior

Request $B$ alone=Behavioral Activity $X$

A machine learning model trained based on the above observed data will therefore be trained to identify the relationship between Request B and Behavioral Activity X. As a result, when Request B is received and Behavioral Activity X is subsequently observed, the machine learning model will output a correlation reflecting the observation of this relationship.

Further, it has been identified that grouping requests based on the processes they call allows for effectively distinguishing among requests and their effects on runtime output. As a result, this grouping improves accuracy of correlation detection as compared to solutions where multiple requests that could have caused a subsequent behavior are received at the same time and their effects on subsequent runtime output are therefore entangled.

At S530, runtime output is monitored, and runtime output data is collected. Portions of runtime output to be monitored for may include, but are not limited to, filesystem events, process events, network events, queries to specific databases, and the like. The collected data includes at least behavioral activities of the protected entity. Each of these behavioral activities is the result of a preceding request and can therefore be correlated to a preceding a request in order to isolate the cause of the behavior. This, in turn, may be used to determine whether the behavior represents a cyberattack which requires mitigation.

At S540, the grouped request metadata and the runtime outputs are used to train a machine learning model to identify request-output correlations.

At S550, a firewall enforcement model is created based on the trained machine learning model. In an embodiment, the firewall enforcement model includes a list of allowed request-output correlations, a list of forbidden request-output correlations, or both.

At S560, behavioral activities to monitor for are determined based on the firewall enforcement model. More specifically, the behavioral activities to monitor for include any behavioral activities included in a forbidden request-output correlation such that occurrence of that behavioral activity may indicate forbidden activity.

Returning to FIG. 4, at S420, runtime behavior of the protected entity is monitored based on the created enforcement plan. More specifically, runtime behavior is monitored in order to detect the behavioral activities determined at S560, FIG. 5.

At S430, for each runtime behavior detected at S420, requests preceding occurrence of the behavioral activity are collected and grouped with respect to the processes they call for. The collected requests may include requests occurring in a predetermined period of time prior to the behavioral activities, and the period of time used for each behavioral activity may be different (e.g., based on a known average time between request and activity occurrence).

At S440, the collected requests and their respective behavioral activities are input to a machine learning model trained as described further above with respect to FIG. 5. The model outputs at least correlations between requests and behavioral activities as well as an indication of whether each correlated behavioral activity is allowable or forbidden.

At S450, based on the output of the machine learning model, appropriate actions for responding to the potentially forbidden activities are determined. In an embodiment, S450 includes performing mitigation actions for any behavioral activities correlated to requests that were indicated as forbidden.

Figure 6:
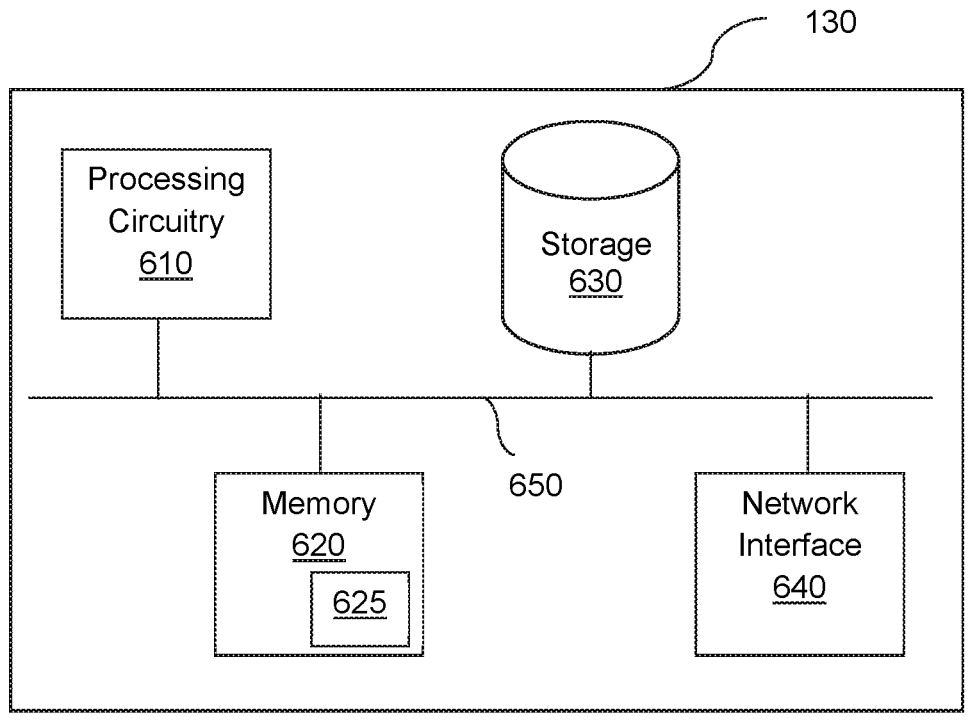
FIG. 6 is a schematic diagram illustrating a firewall policy enforcer according to an embodiment.

FIG. 6 is an example schematic diagram of a firewall policy enforcer 130 according to an embodiment. The firewall policy enforcer 130 includes a processing circuitry 610 coupled to a memory 620, a storage 630, and a network interface 640. In an embodiment, the components of the firewall policy enforcer 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the firewall policy enforcer 130 to communicate with intercept and forward requests directed to a protected entity.

It should be understood that the embodiments described herein are not limited to the specific architecture illustrated in FIG. 6, and other architectures may be equally used without departing from the scope of the disclosed embodiments. In particular, as noted above, the firewall policy enforcer 130 is not necessarily a separate system from the system it protects, and may be realized as an agent or other software implementation installed on the protected system. To this end, in some embodiments, the memory 620 further includes a firewall agent portion 625 containing instructions for performing runtime application protection in accordance with the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:

intercepting a first plurality of requests, wherein each of the first plurality of requests is directed to a corresponding one of a plurality of entities;

buffering the first plurality of requests in a queue;

based on forwarding requests in the first plurality of requests in the queue to respective entities in the plurality of entities, monitoring a first plurality of events at the respective entities in the plurality of entities; and correlating requests in the first plurality of requests with corresponding events in the first plurality of events;

training a machine learning model on the correlated requests and corresponding events to learn first correlations that indicate events in the first plurality of events and corresponding requests in the first plurality of requests that caused those events in the first plurality of events inputting a second plurality of requests and behavioral data for a second plurality of events at entities in the plurality of entities into the trained machine learning model to obtain second correlations as output, wherein the second correlations indicate events in the second plurality of events and corresponding requests in the second plurality of requests that caused those events in the second plurality of events; and determining at least one of allowed and forbidden ones of the second correlations.

2. The method of claim 1, further comprising:

detecting one or more impermissible events at a first entity in the plurality of entities based on monitoring events at the plurality of entities;

obtaining a second plurality of requests in a time period preceding the detected one or more impermissible events;

inputting the second plurality of requests and the one or more impermissible events into the trained machine learning model to determine a subset of the second plurality of requests correlated with the one or more impermissible events; and indicating mitigation action at the first entity based, at least in part, on the subset of the second plurality of requests and the one or more impermissible events.

3. The method of claim 2, further comprising training a firewall model to detect permissible and impermissible events at each of the plurality of entities, wherein detecting the one or more impermissible events at the first entity comprises inputting metadata for events at the first entity into the firewall model.

4. The method of claim 3, wherein training the firewall model to detect permissible and impermissible events comprises training the firewall model according to one or more policies comprising one or more lists of permissible and impermissible request-to-event correlations.

5. The method of claim 1, wherein the events at the plurality of entities comprise at least one of filesystem events, process events, network events, and queries to databases.

6. A non-transitory computer readable medium having stored thereon program code comprising instructions to:

intercept a first plurality of requests, wherein each of the first plurality of requests is directed to a corresponding one of a plurality of entities;

buffer the first plurality of requests in a queue;

based on forwarding requests in the first plurality of requests in the queue to respective entities in the plurality of entities, monitor a first plurality of events at the respective entities in the plurality of entities; and correlate requests in the first plurality of requests with corresponding events in the first plurality of events;

train a machine learning model on the correlated requests and corresponding events to learn first correlations that indicate events in the first plurality of events and corresponding requests in the first plurality of requests that caused those events in the first plurality of events;

input a second plurality of requests and behavioral data for a second plurality of events at entities in the plurality of entities into the trained machine learning model to obtain second correlations as output, wherein the second correlations indicate events in the second plurality of events and corresponding requests in the second plurality of requests that caused those events in the second plurality of events; and determine at least one of allowed and forbidden ones of the second correlations.

7. A system comprising:

a processor; and a machine-readable medium having instructions stored thereon that are executable by the processor to cause the system to, intercept a first plurality of requests, wherein each of the first plurality of requests is directed to a corresponding one of a plurality of entities;

buffer the first plurality of requests in a queue;

based on forwarding requests in the first plurality of requests in the queue to respective entities in the plurality of entities, monitor a first plurality of events at the respective entities in the plurality of entities; and correlate requests in the first plurality of requests with corresponding events in the first plurality of events;

train a machine learning model on the correlated requests and corresponding events to learn first correlations that indicate events in the first plurality of events and corresponding requests in the first plurality of requests that caused those events in the first plurality of events;

input a second plurality of requests and behavioral data for a second plurality of events at entities in the plurality of entities into the trained machine learning model to obtain second correlations as output, wherein the second correlations indicate events in the second plurality of events and corresponding requests in the second plurality of requests that caused those events in the second plurality of events; and determining at least one of allowed and forbidden ones of the second correlations.

8. The system of claim 7, wherein the machine-readable medium further has instructions stored thereon executable by the processor to cause the system to:

detect one or more impermissible events at a first entity in the plurality of entities based on monitoring events at the plurality of entities;

obtain a second plurality of requests in a time period preceding the detected one or more impermissible events;

input the second plurality of requests and the one or more impermissible events into the trained machine learning model to determine a subset of the second plurality of requests correlated with the one or more impermissible events; and indicate mitigation action at the first entity based, at least in part, on the subset of the second plurality of requests and the one or more impermissible events.

9. The system of claim 8, wherein the machine-readable medium further has instructions stored thereon executable by the processor to cause the system to train a firewall model to detect permissible and impermissible events at each of the plurality of entities, wherein the instructions executable by the processor to cause the system to detect the one or more impermissible events at the first entity comprise instructions to input metadata for events at the first entity into the firewall model.

10. The system of claim 9, wherein the instructions executable by the processor to cause the system to train the firewall model to detect permissible and impermissible events comprise instructions executable by the processor to cause the system to train the firewall model according to one or more policies comprising one or more lists of permissible and impermissible request-to-event correlations.

11. The computer readable medium of claim 6, wherein the program code further comprises instructions to:

detect one or more impermissible events at a first entity in the plurality of entities based on monitoring events at the plurality of entities;

obtain a second plurality of requests in a time period preceding the detected one or more impermissible events;

input the second plurality of requests and the one or more impermissible events into the trained machine learning model to determine a subset of the second plurality of requests correlated with the one or more impermissible events; and indicate mitigation action at the first entity based, at least in part, on the subset of the second plurality of requests and the one or more impermissible events.

12. The computer readable medium of claim 11, wherein the program code further comprises instructions to train a firewall model to detect permissible and impermissible events at each of the plurality of entities, wherein the instructions to detect the one or more impermissible events at the first entity comprise instructions to input metadata for events at the first entity into the firewall model.

13. The computer readable medium of claim 12, wherein the instructions to train the firewall model to detect permissible and impermissible events comprise instructions to train the firewall model according to one or more policies comprising one or more lists of permissible and impermissible request-to-event correlations.

14. A method comprising:

grouping metadata of subsets of a first plurality of requests directed to a protected entity, wherein the subsets of requests are differentiated by called process and wherein metadata of each request within a subset of requests indicates a same process;

buffering subsets of requests grouped by called process in a queue;

based on processing subsets of requests in the queue at the protected entity, correlating events in a first plurality of events at the protected entity with respect to each called process with corresponding subsets of the first plurality of requests;

training a machine learning model on the correlated requests and corresponding events at the protected entity, wherein the machine learning model is trained to learn first correlations that indicate events in the first plurality of events and corresponding requests in a first plurality of requests that caused those events in the first plurality of events;

inputting a second plurality of requests and behavioral data for a second plurality of events at the protected entity into the trained machine learning model to obtain second correlations as output, wherein the second correlations indicate events in the second plurality of events and corresponding requests in the second plurality of requests that caused those events in the second plurality of events; and determining at least one of allowed and forbidden ones of the second correlations.

15. The method of claim 14, further comprising:

detecting one or more impermissible events at a protected entity based on monitoring events at the protected entity;

obtaining a second plurality of requests directed to the protected entity in a time period preceding the detected one or more impermissible events;

grouping metadata of subsets of the second plurality of requests, wherein the subsets of requests are differentiated by called process and metadata of each request within a subset of requests indicates a same process;

inputting the second plurality of requests and the one or more impermissible events into the trained machine learning model to determine a subset of the second plurality of requests correlated with the one or more impermissible events; and indicating mitigation action at the protected entity based, at least in part, on the subset of the second plurality of requests and the one or more impermissible events.

16. The method of claim 15, further comprising training a firewall model to detect permissible and impermissible events at the protected entity, wherein detecting the one or more impermissible events at the protected entity comprises inputting metadata for events at the protected entity into the firewall model.

17. The method of claim 16, wherein training the firewall model to detect permissible and impermissible events comprises training the firewall model according to one or more policies comprising one or more lists of permissible and impermissible request-to- event correlations.

18. The method of claim 14, wherein the events at the protected entity comprise at least one of filesystem events, process events, network events, and queries to databases.

19. A non-transitory computer readable medium having stored thereon program code comprising instructions to:

group metadata of subsets of a first plurality of requests directed to a protected entity, wherein the subsets of requests are differentiated by called process and wherein metadata of each request within a subset of requests indicates a same process;

buffer subsets of requests grouped by called process in a queue;

based on processing subsets of requests in the queue at the protected entity, correlate events in a first plurality of events at the protected entity with respect to each called process with corresponding subsets of the first plurality of requests;

train a machine learning model on the correlated requests and corresponding events at the protected entity, wherein the machine learning model is trained to learn first correlations that indicate events in the first plurality of events and corresponding requests in the first plurality of requests that caused those events in the first plurality of events;

input a second plurality of requests and behavioral data for a second plurality of events at the protected entity into the trained machine learning model to obtain second correlations as output, wherein the second correlations indicate events in the second plurality of events and corresponding requests in the second plurality of requests that caused those events in the second plurality of events; and determine at least one of allowed and forbidden ones of the second correlations.

20. The computer readable medium of claim 19, wherein the program code further comprises instructions to:

detect one or more impermissible events at a protected entity based on monitoring events at the protected entity;

obtain a second plurality of requests directed to the protected entity in a time period preceding the detected one or more impermissible events;

group metadata of subsets of the second plurality of requests, wherein the subsets of requests are differentiated by called process and metadata of each request within a subset of requests indicates a same process;

input the second plurality of requests and the one or more impermissible events into the trained machine learning model to determine a subset of the second plurality of requests correlated with the one or more impermissible events; and indicate mitigation action at the protected entity based, at least in part, on the subset of the second plurality of requests and the one or more impermissible events.

21. The computer readable medium of claim 20, wherein the program code further comprises instructions to train a firewall model to detect permissible and impermissible events at the protected entity, wherein the instructions to detect the one or more impermissible events at the protected entity comprise instructions to input metadata for events at the protected entity into the firewall model.

22. The computer readable medium of claim 21, wherein the instructions to train the firewall model to detect permissible and impermissible events comprise instructions to train the firewall model according to one or more policies comprising one or more lists of permissible and impermissible request-to-event correlations.

23. A system comprising:

a processor; and a machine-readable medium having instructions stored thereon that are executable by the processor to cause the system to, group metadata of subsets of a first plurality of requests directed to a protected entity, wherein the subsets of requests are differentiated by called process and wherein metadata of each request within a subset of requests indicates a same process;

buffer subsets of requests grouped by called process in a queue;

based on processing subsets of requests in the queue at the protected entity, correlate events in a first plurality of events at the protected entity with respect to each called process with corresponding subsets of the first plurality of requests;

train a machine learning model on the correlated requests and corresponding events at the protected entity, wherein the machine learning model is trained to learn first correlations that indicate events in the first plurality of events and corresponding requests in the first plurality of requests that caused those events in the first plurality of events;

input a second plurality of requests and behavioral data for a second plurality of events at the protected entity into the trained machine learning model to obtain second correlations as output, wherein the second correlations indicate events in the second plurality of events and corresponding requests in the second plurality of requests that caused those events in the second plurality of events; and determine at least one of allowed and forbidden ones of the second correlations.

24. The system of claim 23, wherein the machine-readable medium further has instructions stored thereon executable by the processor to cause the system to:

detect one or more impermissible events at a protected entity based on monitoring events at the protected entity;

obtain a second plurality of requests directed to the protected entity in a time period preceding the detected one or more impermissible events;

group metadata of subsets of the second plurality of requests, wherein the subsets of requests are differentiated by called process and metadata of each request within a subset of requests indicates a same process;

input the second plurality of requests and the one or more impermissible events into the trained machine learning model to determine a subset of the second plurality of requests correlated with the one or more impermissible events; and indicate mitigation action at the protected entity based, at least in part, on the subset of the second plurality of requests and the one or more impermissible events.

25. The system of claim 24, wherein the machine-readable medium further has instructions stored thereon executable by the processor to cause the system to train a firewall model to detect permissible and impermissible events at the protected entity, wherein the instructions executable by the processor to cause the system to detect the one or more impermissible events at the protected entity comprise instructions to input metadata for events at the protected entity into the firewall model.

26. The system of claim 25, wherein the instructions executable by the processor to cause the system to train the firewall model to detect permissible and impermissible events comprise instructions executable by the processor to cause the system to train the firewall model according to one or more policies comprising one or more lists of permissible and impermissible request-to-event correlations.

\* \* \* \* \*